United States Patent [19]
Sugafuji et al.

[11] 4,000,981
[45] Jan. 4, 1977

[54] SINTERED SELF-LUBRICATING ARTICLE

[75] Inventors: Akira Sugafuji, Kamakura; Hiroshi Kurimoto; Tadaaki Takase, both of Fujisawa, all of Japan

[73] Assignee: Oiles Industry Co., Ltd., Tokyo, Japan

[22] Filed: Oct. 6, 1975

[21] Appl. No.: 619,932

[30] Foreign Application Priority Data

Dec. 28, 1974  Japan ............................ 49-149168

[52] U.S. Cl. .............................. 29/182.5; 75/156.5; 75/157; 75/161; 75/159; 75/201; 252/12
[51] Int. Cl.² ........................................... B22F 5/00
[58] Field of Search ............ 75/200, 201, 157, 161, 75/159, 156.5; 29/182.5; 252/12

[56] References Cited

UNITED STATES PATENTS

| | | | |
|---|---|---|---|
| 1,648,722 | 11/1927 | Claus | 75/157 |
| 1,792,146 | 2/1931 | Corson | 75/157 |
| 1,988,938 | 1/1935 | Corson | 75/157 |
| 3,795,493 | 3/1974 | Mertl | 29/182.5 |
| 3,821,111 | 6/1974 | Abe et al. | 252/12 |

*Primary Examiner*—Brooks H. Hunt

[57] ABSTRACT

A sintered self-lubricating article having great oxidation resistance, high dimension-stability and high wear resistance at elevated temperatures without assistance of any other lubricants and consisting essentially of 5 to 10% by weight of tin, 8 to 40% by weight of zinc, 5 to 15% by weight of graphite and the balance being copper.

8 Claims, 8 Drawing Figures

4,000,981

SINTERED SELF-LUBRICATING ARTICLE

BACKGROUND AND SUMMARY OF THE INVENTION

The present invention relates to a sintered self-lubricating article prepared by powder metallurgical method and particularly to a sintered self-lubricating article usable as lubricating elements at elevated temperatures near 300° C without assistance of any other lubricant e.g. oil or grease.

In the prior art, bronze-graphite sintered article is conventional and commonly used as a sintered lubricating article.

However, these sintered lubricating articles are disadvantageous in that they are not safely usable as self-subricating elements without assistance of suitable lubricant e.g. oil or grease and/or at elevated temperatures near 300° C.

This is because when used under such severe conditions, each component of the article is inevitably highly oxidized, resulting in growth (dimensional change) by heat to cause remarkable drop of wear resistance or mechanical strength or the like. Such degradation of properties of a lubricating article comprising e.g. a bush type sintered element results in change of diametrical size and thus clinging to a shaft, to cause extraordinary wear, while oxidation of graphite and production of metal oxide causes increase in wear coefficient and damage of a shaft, as well as fructure and cracks due to drop of mechanical strength.

It has been found that these disadvantages in the prior art can be eliminated by a sintered self-lubricating article according to the present invention, said article having great oxidation resistance, high dimension stability and high wear resistance at elevated temperature without assistance of any other lubricants and consisting essentially of 5 to 10 percent by weight of tin, 8 to 40 percent by weight of zinc, 5 to 15 percent by weight of graphite and the balance being copper.

It is one of the most important properties for a self-lubricating article used in the absence of any lubricant e.g. oil or grease, namely, under a so-called dry lubricating condition, that solid lubricating film is sufficiently formed or an excellent film-forming property is provided.

The said solid film contributes to improvement in wear resistance and seizure resistance of the said article.

According to the present invention, it has been found that a sintered article including more lithium fluoride is remarkably improved in film-forming property thereof.

Accordingly, the present invention also relates to an improvement in film-forming property of a sintered self-lubricating article.

In the sintered self-lubricating article according to the invention as described above, said article further contains less than 5 percent by weight of lithium fluoride, and being further characterized by improved properties of forming lubricating solid-film.

BRIEF DESCRIPTION OF THE DRAWINGS

FIG. 3(A) is an X-ray diffraction pattern of a conventional sintered article before repeating heating and cooling operation cycles, while FIG. 3(B) is an X-ray diffraction pattern of the said conventional sintered article after 165 times of the said operation cycles.

FIG. 4(A) is an X-ray diffraction pattern of a sintered article according to the present invention before repeated heating and cooling operations, while FIG. 4(B) is an X-ray diffraction pattern of the said sintered article of FIG. 4(A) after 165 times of the said operation cycles.

DETAILED DESCRIPTION OF THE INVENTION

Figure 1:
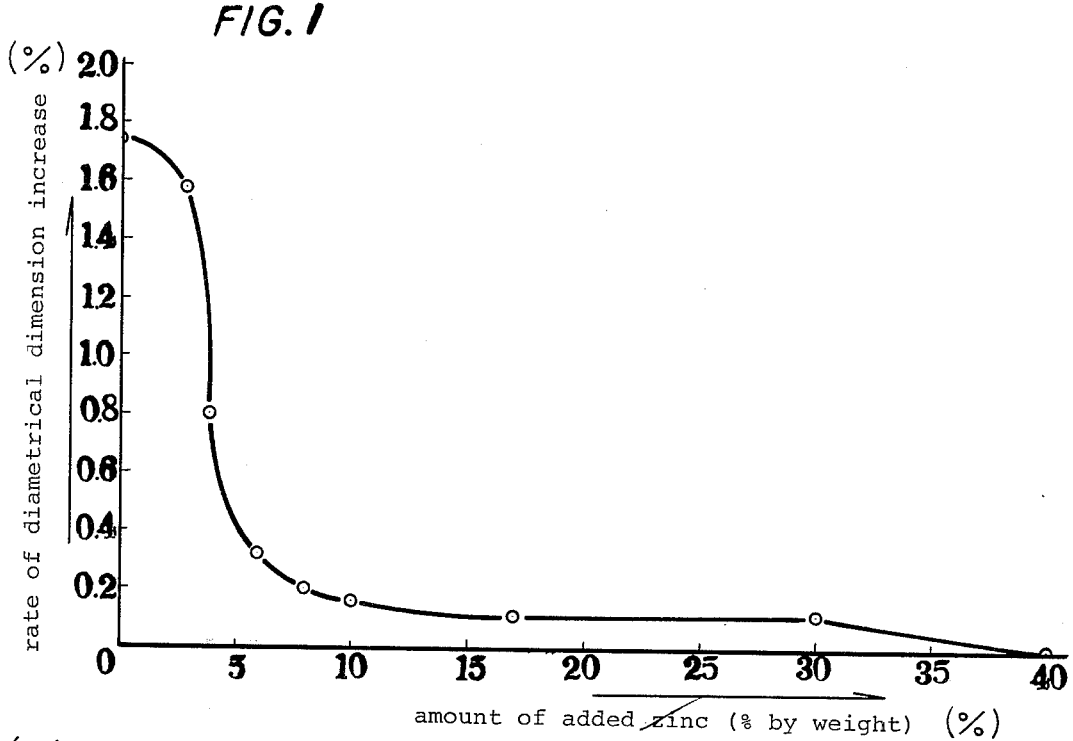
FIG. 1 is a graph illustrating the relation between the amount of added zinc and the increase rate of diametrical dimension of a bush type sintered article in a sintered self-lubricating article according to the present invention.

It is convinced that the composition range of each component of a sintered self-lubricating article apparently has a critical importance from the following summary of the results of the tests.

Tin is such an element as exerts, when allowed with copper to form bronze, effects of improving toughness, mechanical strength and wear resistance of the alloy.

The amount of tin to be added is decided in consideration of the required improvement in toughness, mechanical strength and wear resistance and the purpose of use, and further of the amount of graphite and zinc to be added. However, below 5 percent by weight of tin does not exert any effect in respect of toughness, mechanical strength and wear resistance, while about 10 percent by weight is disadvantageous in respect of strength, having a bad influence on sintering property. Therefore, the amount of tin to be added is preferably 5–10 percent by weight and most preferably 5–7 percent by weight.

It is difficult to add a large amount of graphite because it cannot form solid solution with another element. Accordingly, the amount of graphite to be added is suitably decided in consideration of load condition and others. However, above 15 percent by weight of graphite causes remarkable drop of mechanical strength which is hardly recovered by changing preparing conditions e.g. molding pressure and sintering temperature.

On the other hand, when below 5 percent by weight of tin is added, though a large mechanical strength is obtained, the alloy cannot be applied for use without preferable lubricating conditions e.g. positive oiling, because a bad influence is brought to the seizure resistance. But generally, in case of a conventional self-lubricating article obtained by sintering, not forming a perfect liquid lubricating film on its sliding surface, only boundary lubrication through metal contact is effected, so that it is necessary to prevent clinging or seizure. Such properties resisting against clinging or seizure are similarly desired and of importance in a self-lubricating article based on solid lubrication. By adding above 5 percent by weight of graphite, resistance against clinging or seizure is considerably improved. It has proved from experiments that about 7–10 percent by weight of graphite need to be added in order to further improve self-lubricating property.

Zinc is an element which forms brass when alloyed with copper, and a copper-tin-zinc alloy when alloyed with bronze to improve not only the strength of the alloy, mechanical strength and wear resistance similarly to the abovementioned tin but also oxidation resistance and dimension stability of a self-lubricating article made of the alloy.

Addition of below 8 percent by weight of zinc into a self-lubricating article shows no effect in improving wear resistance and dimension stability, while above 40 percent by weight of zinc, though improving dimension stability, lowers wear resistance and causes dimensional growth during sintering, thus to have a bad influence on sintering property. And the results of experiments have proved that 8–40 percent, preferably 10–30 percent by weight of zinc is effective in respect of wear resistance, oxidation resistance and dimension stability.

Lithium fluoride (LiF) shows an effect, when added into a self-lubricating article, of promoting formation of the solid lubricating film on the surface of the article to solidify the film, thus improving wear resistance and seizure resistance. Lithium fluoride, unlike graphite, does not show self-lubricating property, but when added in a small amount to the article, can promote film formation thereof, thus improving wear resistance and seizure resistance as abovementioned. The most preferable effect is obtained by the addition of 2 percent by weight of LiF.

However, when further increased amount e.g. above 0.5 percent by weight of LiF is added, the article increasingly clings to the mating member, having a bad influence on the lubricating property as well as remarkably lowering the mechanical strength. And it has been proved that preferably below 5 percent by weight of LiF is to be added.

Further, one or more metals selected from the group consisting of nickel, chromium, manganese and iron may be added in the amount of 0.5–1.5 by weight according to the purpose of use of the sintered self-lubricating article of the present invention. Nickel and manganese can form solid solution in the alloy to improve toughness and wear resistance, such effect being remarkable especialy when the alloy is used at elevated temperatures. Iron does not form solid solution but is dispersed in the alloy, while chromium partly forms solid solution therein to increase hardness and strength thereof.

A sintered self-lubricating article according to the present invention is prepared by a usual powder metallurgical method. A typical method is set forth below.

A predetermined amount of each metal powder, graphite powder and further optionally lithium fluoride powder are mixed under uniformly stirring to obtain a powder mixture. And the powder mixture is put into a mold and pressure-molded generally under the pressure of 4–7 t/cm². Then, the obtained molded article(-green compact) is sintered in a non-oxidizing, preferably reducing atmosphere at about 750°–830° C for approximately 30–60 minutes.

The reducing atmosphere may preferably comprise a stream of hydrogen gas, or a natural gas consisting of hydrogen as the main component and further nitrogen, carbon monoxide and others.

The method of preparing a sintered self-lubricating article according to the present invention is not limited to the said method, but can be changed in various manners, of course.

In the belowmentioned examples of the present invention, the following glanular diameters and kinds of components were used:

250 mesh electrolysed copper powder; 200 mesh grinded tin powder; 150 mesh scaly graphite powder; and 325 mesh first class reagent powder of lithium fluoride.

Such glanular diameters of the components can be widely changed, of course, which is not detailedly described here because of being well known in powder metallurgical methods.

Further, in place of a part of the whole of copper powder and zinc powder, brass powder (e.g. 70/30 brass) may be used. Thus, not only metal powder of single substances but also suitable alloy powder can be optionally used.

A sintered self-lubricating article according to the present invention prepared as abovementioned, maintains even at elevated temperatures oxidation resistance, dimension stability and wear resistance, and can be used without danger of causing seizure even in the absence of any other lubricant e.g. oil or grease.

The extremely advantageous properties of a sintered self-lubricating article according to the present invention will become more apparent from the belowmentioned test examples.

Examples of appropriate uses of the article according to the present invention are set forth below.

Applications where no oiling is desired:
Ships:
  hatch cover, bush, door hinge metal, deck crane sieve metal, roller conveyor metal for fishing boat,
Industrial machines:
  bucket elevator metal, screw conveyor metal, roller conveyor metal, various kinds of compressor bearing, hydraulic pump metal, guide metal for pressure machines
Transport machines:
  overhead travelling crane wheel bearing, hoist sieve metal, other truck crane metal, table lifter bearing, vertical garage chain wheel bush
Applications in high temperature atmosphere:
Iron manufacturing machines:
  bearing for continuous casting equipment, bearing for cooling bed, hot coil conveyor roller bush, other bearings for iron and steel manufacturing rolling,
Food production machines:
  bread production conveyor metal and others,
Machines for office:
  bearing for dry and wet reproduction machine,
Other machines:
  machine tool, heavy electric machines, printing machines, agricultural machine, atomic power machine and others.

EXAMPLE 1

A uniformly stirred powder mixture consisting of 5 percent by weight of tin powder, 7 percent by weight of graphite powder, 5–45 percent by weight of zinc powder and the balance being copper powder was put into a mold, molded under a molding pressure of 5 tons/cm², and sintered in a hydrogen atmosphere at 780° C for 1 hour thus to obtain a sintered self-lubricating article. The features of the article are shown in the items of specimens Nos. 1–12 of Table I.

EXAMPLE 2

A uniformly stirred powder mixture consisting of determined percent values of 5 percent by weight of tin powder, 14 percent by weight of zinc powder and 7 percent by weight of graphite powder, 0.5–1.5 percent by weight of one or more kinds of metal powder selected from the group consisting of nickel, chromium, manganese and iron powder and the balance being copper powder was put into a mold, molded under the molding pressure of 5 ton/cm² and then sintered in a hydrogen atmosphere at 780° C for 1 hour, thus to obtain a sintered self-lubricating article.

The features of the article are shown in the items of specimens Nos. 13–17 of Table I.

from the group consisting of nickel, chromium, manganese and iron powder and the balance being copper powder was put into a mold, molded under the molding pressure of 5 ton/cm² and then stirred in a hydrogen atmosphere at 780° C for 1 hour, thus to obtain a sintered self-lubricating article.

The features of the article are shown in the items of specimens Nos. 25–29 of Table I below.

In the Examples 1–4, single substances of copper, tin and zinc were used, but alloys of these metals instead of them may be applied as abovementioned.

TABLE 1

| (a)<br>(b) | | Cu | Sn | Gr | Zn | LiF | Ni.Cr.<br>Mn.Fe. | (c) | (d) | amount of wear (mm) |
|---|---|---|---|---|---|---|---|---|---|---|
| A | | rest | 5 | 7 | — | — | — | 16 | 60 | 4×10⁻¹ |
| | 1 | rest | 5 | 7 | 5 | — | — | 15 | 55 | 4×10⁻¹ |
| | 2 | " | " | " | 8 | — | — | 15 | 62 | 1.8×10⁻¹ |
| | 3 | " | " | " | 10 | — | — | 15 | 70 | 1.8×10⁻¹ |
| | 4 | " | " | " | 12 | — | — | 15 | 83 | 1.6×10⁻¹ |
| | 5 | " | " | " | 14 | — | — | 15 | 97 | 1.5×10⁻¹ |
| EXAMPLE | 6 | " | " | " | 15 | — | — | 14 | 95 | 1.3×10⁻¹ |
| 1 | 7 | " | " | " | 20 | — | — | 14 | 95 | 1.3×10⁻¹ |
| | 8 | " | " | " | 25 | — | — | 14 | 90 | 1.5×10⁻¹ |
| | 9 | " | " | " | 30 | — | — | 14 | 87 | 2.0×10⁻¹ |
| | 10 | " | " | " | 35 | — | — | 13 | 85 | 2.3×10⁻¹ |
| | 11 | " | " | " | 40 | — | — | 13 | 80 | 2.5×10⁻¹ |
| | 12 | " | " | " | 45 | — | — | 13 | 78 | 3.7×10⁻¹ |
| | 13 | rest | 5 | 7 | 14 | — | Ni:0.5 | 15 | 97 | 1.5×10⁻¹ |
| EXAMPLE | 14 | " | " | " | " | — | Cr:0.5 | 15 | 98 | 1.5×10⁻¹ |
| 2 | 15 | " | " | " | " | — | Mn:1.0 | 14 | 97 | 1.6×10⁻¹ |
| | 16 | " | " | " | " | — | Fe:1.0 | 15 | 98 | 1.6×10⁻¹ |
| | 17 | " | " | " | " | — | Cr:1.0<br>Ni:0.5 | 15 | 97 | 1.4×10⁻¹ |
| | 18 | rest | 5 | 7 | 10 | 0.5 | — | 15 | 75 | 1.5×10⁻¹ |
| | 19 | " | " | " | " | 1.0 | — | 14 | 77 | 1.3×10⁻¹ |
| EXAMPLE | 20 | " | " | " | " | 2.0 | — | 14 | 78 | 1.0×10⁻¹ |
| 3 | 21 | " | " | " | " | 3.0 | — | 14 | 78 | 1.2×10⁻¹ |
| | 22 | " | " | 41 | " | 4.0 | — | 13 | 76 | 1.3×10⁻¹ |
| | 23 | " | " | " | " | 5.0 | — | 13 | 76 | 1.5×10⁻¹ |
| | 24 | " | " | " | " | 6.0 | — | 12 | 70 | 2.8×10⁻¹ |
| | 25 | rest | 5 | 7 | 10 | 2.0 | Ni:1.0 | 14 | 83 | 1.0×10⁻¹ |
| EXAMPLE | 26 | " | " | " | " | " | Ni:0.5<br>Cr:1.0 | 14 | 83 | 1.2×10⁻¹ |
| 4 | 27 | " | " | " | " | " | Cr:0.5<br>Mn:0.5 | 14 | 82 | 1.1×10⁻¹ |
| | 28 | " | " | " | " | " | Mn:0.5<br>Fe:1.0 | 14 | 83 | 1.0×10⁻¹ |
| | 29 | " | " | " | " | " | Cr:0.5<br>Fe:1.0 | 15 | 82 | 1.2×10⁻¹ |

Note:
(a): component & property (b): specimen No.
(c): radial crushing strength constant (K)
(d): micro vickers hardness

EXAMPLE 3

A uniformly stirred powder mixture consisting of 5 percent by weight of tin powder, 10 percent by weight of zinc powder and 7 percent by weight of graphite powder, 0.5–6 percent by weight of lithium fluoride powder and the balance being copper powder was put into a mold, molded under the molding pressure of 5 ton/cm² and then sintered in a hydrogen atmosphere at 780° C for 1 hour, thus to obtain a sintered self-lubricating article.

The features of the article are shown in the items of specimens Nos. 18–24 of Table I.

EXAMPLE 4

A uniformly stirred powder mixture consisting of 5 percent by weight of tin powder, 10 percent by weight of zinc powder, 7 percent of graphite powder, 2 percent by weight of lithium fluoride, 0.5–1.5 percent by weight of one or more kinds of metal powder selected Other important physical properties of a sintered self-lubricating article were gravity of 6.3–6.5, coefficient of thermal expansion of about $2.0 \times 10^{-5}/°$ C (0°–300° C) and coefficient of friction of 0.1–0.3 (under dry condition) and others.

The radial crushing strength constant (K) was calculated according to the following formula.

$$K = \frac{P(D-T)}{L\,T^2}$$

wherein P is radial crushing load (kg); D, outer diameter of the article(mm); L, length of the article(mm); and T, thickness of the article(mm).

Further, the amount of wear was measured 10 hours after the test under the following conditions.

Rate:
  5 m/min

Load:
 20kg/cm²
Dimensions of a specimen:
 inner diameter 16 mm
 outer diameter 28 mm
 length 20 mm
Temperature atmosphere:
 200° C
Tester:
 Suzuki thrust tester

TEST EXAMPLE 1

This test example relates to oxidation resistance and dimension stability of a sintered self-lubricating article according to the present invention.

Dimension stability is an important property especially when the article is used as a bearing. Many of self-lubricating articles containing solid lubricant are used in high temperature atmosphere e.g. in a car bottom furnace and heat treatment furnace in a steel works, and subject to elevated temperatures thereby and further by temperature rise of the bearing itself by friction heat. In case of a bush type self-lubricating article, generally its outer diameter is press fit into a housing in use and any change of dimension due to the said temperature rise has influence on its inner diameter. Consequently, change of dimension causes the bearing to cling to the shaft, preventing smooth sliding and causing extraordinary wear which results in accidents.

Having found that such change of dimension of the article due to temperature rise results rather from the component itself of the article than from the influence by molding pressure and sintering temperature in preparing the article, the inventors have succeeded in remarkably lowering the rate of dimension change by adding zinc as abovementioned.

FIG. 1 is a graph illustrating the relation between the amount of added zinc and the rate of diametrical dimension increase of a bush type sintered article. In the test, a specimen according to the present invention was held in a furnace at 300° C of atmosphere temperature for 40 minutes, taken out, cooled to room temperature and held under this condition for 40 minutes, these series of operations being regarded as a heating and cooling cycle. And after repeating 165 cycles, the relation between the amount of added zinc and the rate of diametrical dimension increase of the article was measured and shown in the graph.

As shown in the graph, the rate of dimension increase of the article decreases as addition of zinc increases. And when 3 percent by weight of zinc was added the effect was actualized, while at 8–30 percent the rate of dimension increase was lowered to one eighth of that of the conventional sintered article.

When above 40 percent by weight of zinc was added, though dimension change due to temperature rise was hardly recognized, showing dimension stability, but wear resistance was lowered as well as expansion during sintering was hardly prevented, thus lowering sintering property as abovementioned.

Figure 2:
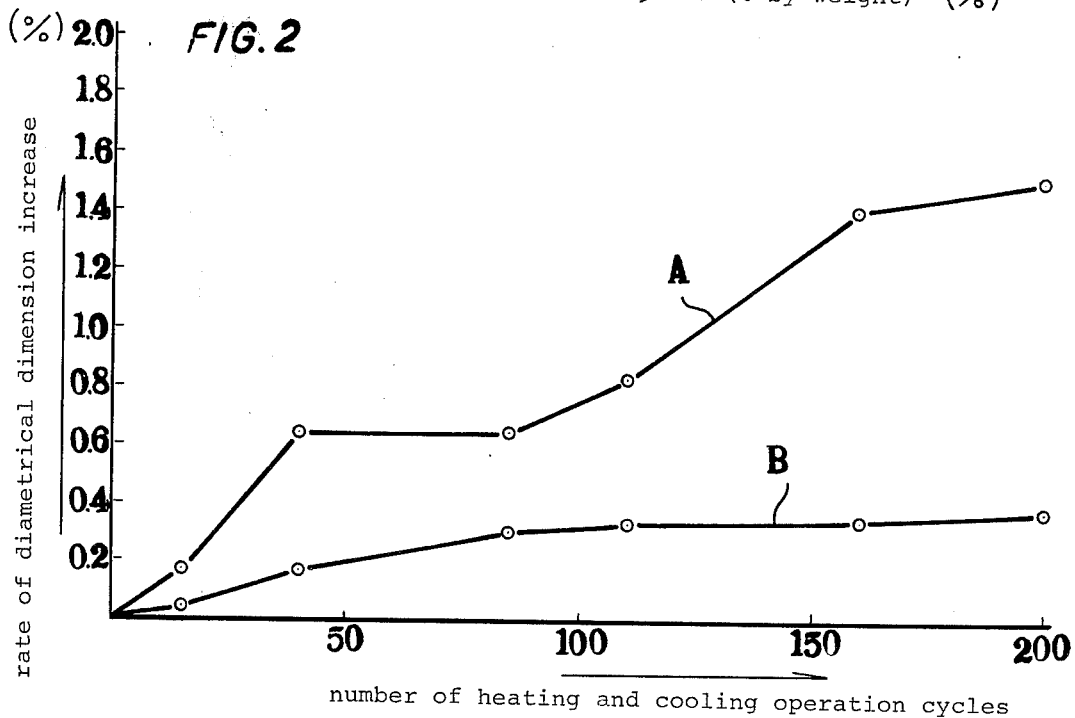
FIG. 2 is a graph ilustrating the relation between the number of repeated heating and cooling operation cycles and the rate of increase of the diametrical dimension of a sintered bush article.

FIG. 2 is a graph illustrating the relation between the numbers of repeated heating and cooling operation cycles and the rate of the diametrical dimension increase of a bush type sintered article. In the drawings, hereafter, designation A indicates the case of a conventional sintered article consisting of 5 percent by weight of tin, 7 percent by weight of graphite and the rest percent by weight of copper, and designation B, the case of a sintered article according to the present invention consisting of 5 percent by weight of tin, 10 percent by weight of zinc, 7 percent by weight of graphite and the rest percent by weight of copper.

At the beginning of the series of repeated heating and cooling cycles, internal deformation produced in the molded article during molding an thermal deformation produced during sintering is considered to be relieved, and there was no remarkable difference between the rates of dimension change of the article according to the present invention and the conventional one.

However, the conventional article showed a rapid dimension change (increase) as the number of repeated heating and cooling cycles increases. It is considered because graphite included in the sintered article was oxidized, thereby beginning to rapidly form air gap therein as well as causing the article to continuously expand due to the pressure of the generated gas.

On the other hand, it is considered that in case of the sintered article including zinc according to the present invention, the said included zinc is oxidized to begin to form a zinc oxide (ZnO) film, which becomes a continued film as the cooling and heating operations are repeated many times, and at last the graphite and the alloy covered with this zinc oxide film is prevented from being oxidized, thereby lowering the rate of dimension change of the article.

The abovementioned matters have been confirmed by the following test.

A sintered article according to the present invention and a conventional one were, after 165 times of repeated heating and cooling operation cycles as abovementioned, subject to X-ray diffraction at their outer surface to obtain the results described below.

Figure 3:
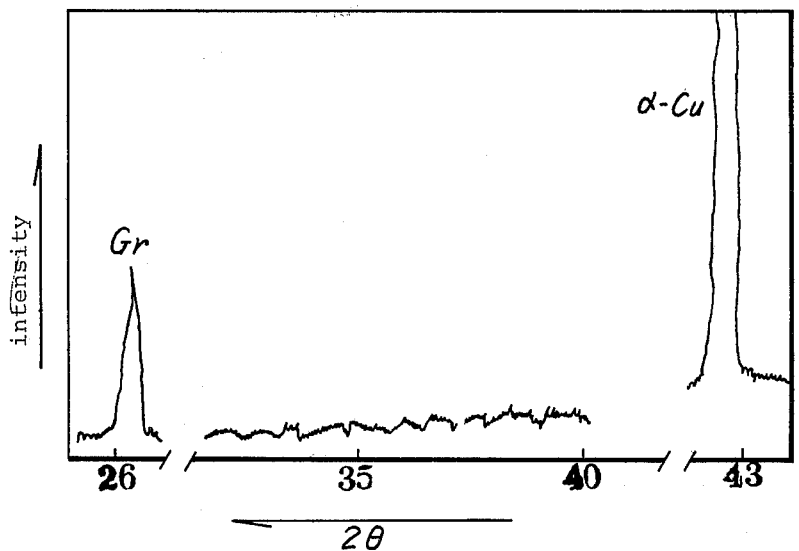
Figure 3:
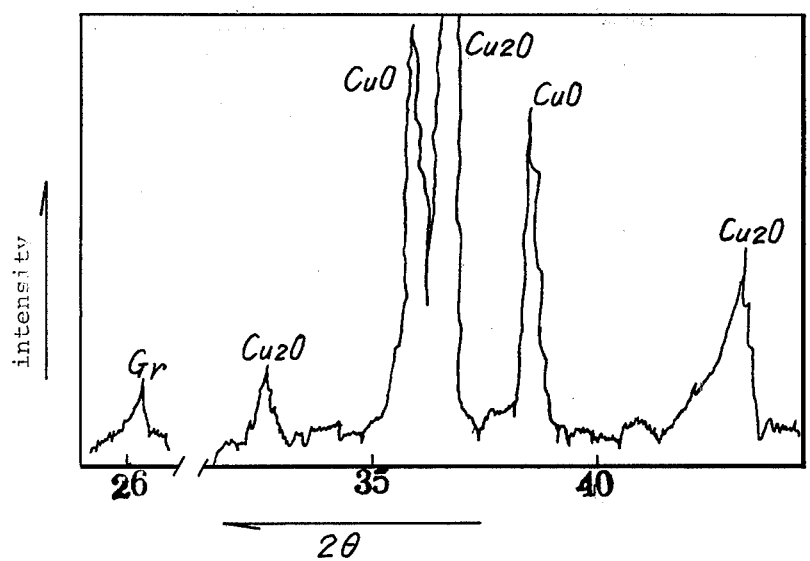

FIG. 3 (A) is an X-ray diffraction pattern of the conventional sintered article before repeated heating and cooling operations, and FIG. 3 (B), after 165 times of repeated heating and cooling operation cycles.

Figure 4:
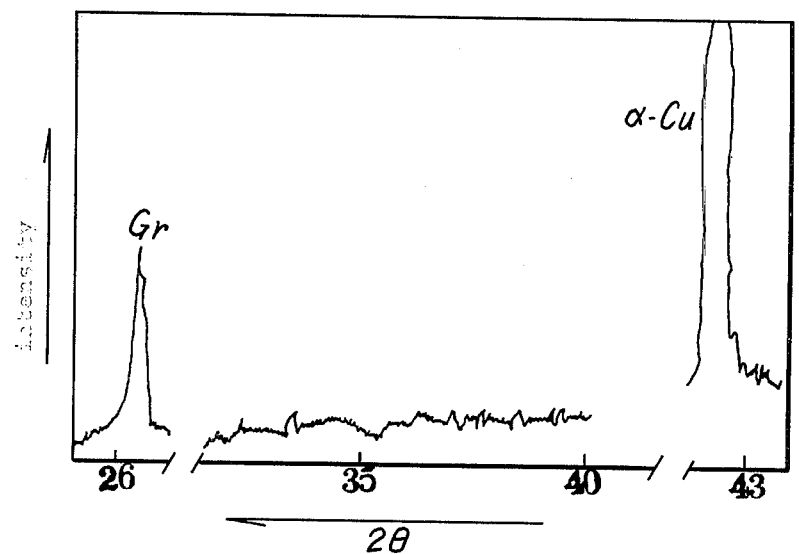
Figure 4:
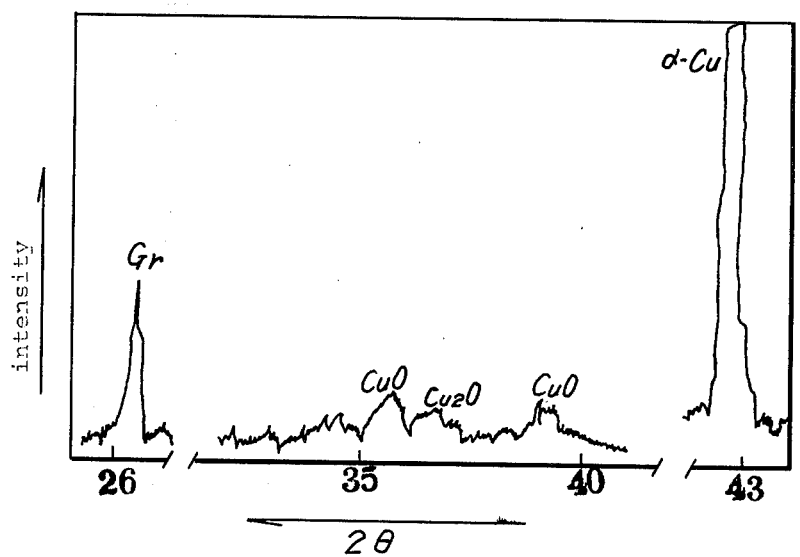

FIG. 4 (A) is an X-ray diffraction pattern of a sintered article according to the present invention before repeated heating and cooling operations, and FIG. 4 (B), after 165 times of repeated heating and cooling operation cycles.

In the copper-tin-graphite sintered article, though graphite was recognized before the test, after 165 times of repeated heating and cooling operations, copper was not detected but had been substantially wholly oxidized to $Cu_2O$ and $CuO$, while graphite, in spite of being detected, had only a low strength of detected X-ray in comparison with that before the test, which means disappearance of graphite through decomposition.

On the other hand, in case of the copper-tin-zinc-graphite sintered article according to the present invention, copper and graphite were detected to show substantially the same X-ray intensity before and after the test, which accordingly means that these substances have not substantially changed in amount. Further, though $Cu_2O$ and $CuO$ were detected, the detected X-ray intensity thereof were low, which means that only small amounts of $Cu_2O$ and $CuO$ were produced.

From the abovementioned X-ray diffraction test, it has been considered that zinc included in a sintered article is gradually dispersed into the surface layer of the article due to temperature rise, then oxidized to ZnO, which forms a continued ZnO film on the said surface and depresses the dimension change (dimension increase) of the article.

As abovementioned, according to the present invention, a sintered self-lubricating article can be obtained which has excellent oxidation resistance and wear resistance at elevated temperatures, and dimension stability under a temperature rising condition, thus being extremely improved in performance thereof.

TEST EXAMPLE 2

Figure 5:
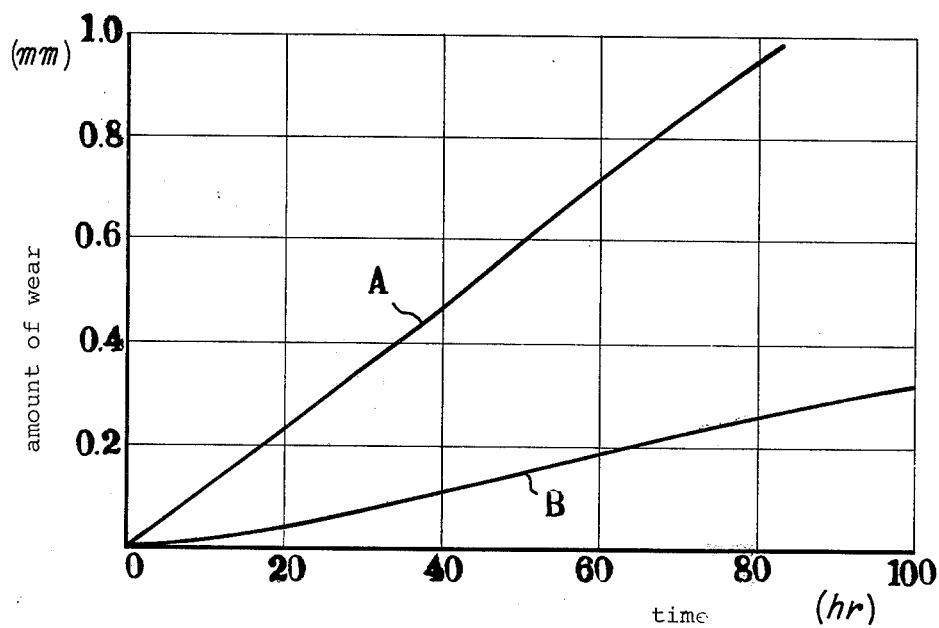
FIGS. 5 and 6 are views for illustrating the experiment of Test Example 2.
Figure 6:
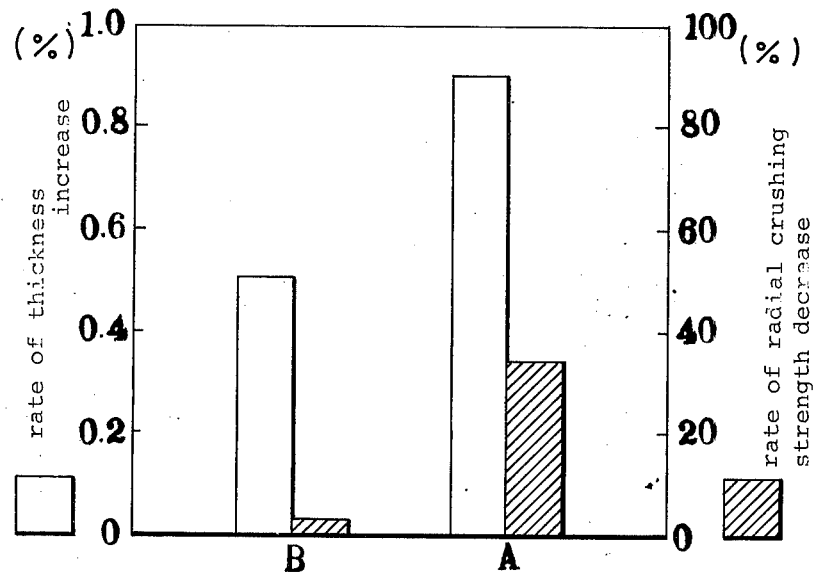

FIG. 5 illustrates the results of a comparative test relating to wear at elevated temperatures of a sintered article according to the present invention and a conventional bronze-graphite bearing, in which the curve A indicates the case of the conventional bearing and the curve B, that according to the present invention. The test was carried out under the following conditions.
Tester:
  Thrust friction tester
Load:
  5 kg/cm$^2$
Sliding rate:
  2m/min
Atmosphere temperature:
  300° C
No lubrication
Dimensions of specimen:
  inner diameter 16 mm
  outer diameter 28 mm
  length 15 mm FIG. 6 illustrates the results of a high temperature exposure test of a sintered article according to the present invention and a conventional blonze-graphite bearing, in which the curve A indicates the case of the conventional bearing and the curve B, that according to the present invention.

The test was carried out under the following conditions.
Test items:
  Thickness and radial crushing strength of a bush before and after the test
Heating condition:
  Repeatedly heating and cooling in the air
Dimensions of specimen:
  inner diameter 16 mm
  outer diameter 28 mm
  length 15 mm
Number of tests:
  150 cycles

TEST EXAMPLE 3

A radial journal friction test was carried out under the following conditions.
Temperature:
  280° C
Load:
  10 kg/cm$^2$
Rate:
  2m/min
Time:
  50 hrs.

A conventional bearing (A) was remarkably cracked, while a sintered article (B) according to the present invention had no crack or damage.

As apparent from rest Examples above, sintered self-lubricating articles according to the present invention had highly improved oxidation resistance, wear resistance and dimension stability in comparison with conventional copper-tin-graphite sintered articles, and such improvements were most remarkably achieved by the additions of about 15 percent by weight of zinc.

Further, unlike graphite, lithium fluoride does not show self-lubricating property by itself, but in association with graphite in the article, it can promote the formation of a solid lubricating film on the sliding surface of the article to solidify the said formed film, thus resulting in improvement of wear resistance and seizure resistance of the article. Such an effect was most remarkably exerted by the addition of 2 percent by weight of lithium fluoride.

Further, when lithium fluoride was used, it was observed after the test that a solid lubricating film had been transferredly formed on the mating member.

What is claimed is:

1. A sintered self-lubricating article having great oxidation resistance, high dimension stability and high wear resistance at elevated temperatures without assistance of any other lubricants and consisting essentially of 5 to 10 percent by weight of tin, 8 to 40 percent by weight of zinc, 5 to 15 percent by weight of graphite and the balance being copper.

2. The article according to claim 1, which contains 5 to 7 percent by weight of tin, 10 to 30 percent by weight of zinc, 5 to 10 percent by weight of graphite and the balance being copper.

3. The article according to claim 1, which contains 5 to 7 percent by weight of tin, 10 to 20 percent by weight of zinc, 5 to 10 percent by weight of graphite and the balance being copper.

4. The article according to claim 1, said article further containing 0.5 to 1.5 percent by weight of at least one element selected from the group consisting of nickel, chromium, manganese and iron.

5. The article according to claim 4, said article further containing less than 5 percent by weight of lithium fluoride and being further characterized by improved properties of forming lubricating solid-film.

6. The article according to claim 5, wherein content of lithium fluoride is 1.0 to 3.0 percent by weight.

7. The article according to claim 1, said article further containing less than 5 percent by weight of lithium fluoride and being further characterized by improved properties of forming lubricating solid-film.

8. The article of claim 7, wherein the content of lithium fluoride is 1.0 to 3.0 percent by weight.

* * * * *